United States Patent
Oroskar et al.

(10) Patent No.: US 11,197,206 B1
(45) Date of Patent: Dec. 7, 2021

(54) DE-CONFIGURING OF DUAL-CONNECTIVITY SERVICE TO FACILITATE VOICE CALL CONTINUITY

(71) Applicant: Sprint Spectrum L.P., Overland Park, KS (US)

(72) Inventors: Siddharth S. Oroskar, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 178 days.

(21) Appl. No.: 16/385,514

(22) Filed: Apr. 16, 2019

(51) Int. Cl.
*H04W 36/00* (2009.01)
*H04W 36/18* (2009.01)
*H04W 36/30* (2009.01)

(52) U.S. Cl.
CPC ... *H04W 36/0027* (2013.01); *H04W 36/0022* (2013.01); *H04W 36/18* (2013.01); *H04W 36/30* (2013.01)

(58) Field of Classification Search
CPC ......... H04W 36/0027; H04W 36/0022; H04W 36/18; H04W 36/30
See application file for complete search history.

(56) References Cited

U.S. PATENT DOCUMENTS

| | | | |
|---|---|---|---|
| 2019/0045404 A1* | 2/2019 | Tsai | H04W 36/0022 |
| 2019/0182741 A1* | 6/2019 | Oyman | H04W 4/24 |
| 2020/0275259 A1* | 8/2020 | Zhu | H04W 8/24 |
| 2020/0322850 A1* | 10/2020 | Zhu | H04W 36/0022 |

OTHER PUBLICATIONS

Teradek; Node—3G/4G/LTE Modem, May 2019 (Year: 2019).*

* cited by examiner

*Primary Examiner* — Ricky Q Ngo
*Assistant Examiner* — Stephen N Steiner (57) ABSTRACT

When a UE is served with dual-connectivity by a master node (MN) over master connection on a first radio access technology (RAT) and a secondary node (SN) over a secondary connection on a second RAT and where the UE is engaged in a voice call over the master connection, an entity detects that quality of the UE's master connection has become threshold poor and responsively carries out a sequence of operations including (i) releasing the UE's secondary connection with the SN so as to transition the UE from dual-connectivity to standalone-connectivity served by the MN, and (ii) then transferring the UE's voice call from being served by the MN on the first RAT to instead being served by a tertiary node (TN) on a third RAT.

16 Claims, 4 Drawing Sheets

DE-CONFIGURING OF DUAL-CONNECTIVITY SERVICE TO FACILITATE VOICE CALL CONTINUITY

BACKGROUND

A cellular wireless network typically includes a number of base stations that are configured to provide wireless coverage areas, such as cells and cell sectors, in which user equipment devices (UEs) such as cell phones, tablet computers, machine-type-communication devices, tracking devices, embedded wireless modules, and/or other wirelessly equipped communication devices (whether or not user operated), can operate. Each base station could be coupled with a core network that provides connectivity with various application servers and/or transport networks, such as the public switched telephone network (PSTN) and/or the Internet for instance. With this arrangement, a UE within coverage of the cellular network could engage in air interface communication with a base station and could thereby communicate via the base station with various application servers and other entities.

Such a network could operate in accordance with a particular radio access technology (RAT), with communications from the base stations to UEs defining a downlink or forward link and communications from the UEs to the base stations defining an uplink or reverse link.

In accordance with the RAT, each coverage area could operate on one or more carriers, each of which could be frequency division duplex (FDD), defining separate frequency channels for downlink and uplink communication, or time division duplex (TDD), with a single frequency channel multiplexed over time between downlink and uplink use. Further, on the downlink and uplink, each such carrier could be structured to define various physical channels for carrying information between the base stations and UEs.

Over the years, the industry has embraced various generations of RATs, in a continuous effort to increase available data rate and quality of service for end users. These generations have ranged from "1G," which used simple analog frequency modulation to facilitate basic voice-call service, to "2G" or "3G," such as Code Division Multiple Access (CDMA), which used spread spectrum coding to facilitate circuit-switched voice service, to "4G"—such as Long Term Evolution (LTE), which facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

As the industry advances from one generation of RAT to the next, issues arise with the need for UEs to support potentially multiple RATs at once. With the transition from 4G LTE to 5G NR, for instance, it is expected that UEs will be configured to support use of both technologies concurrently, with an arrangement referred to as EUTRA-NR Dual Connectivity (EN-DC). With such an arrangement, a UE might include a 4G radio and a 5G radio, with the 4G radio being served by a 4G base station concurrently with the 5G radio being served by a 5G base station. This arrangement could help support transition from 4G technology to 5G technology and could facilitate higher peak throughput by allowing data to be multiplexed over 4G and 5G connections, among possibly other benefits.

More generally, dual connectivity could encompass service on two or more RATs concurrently, to facilitate technology transitions or for other purposes. Dual-connectivity can thus be distinguished from standalone connectivity, where a UE is served on just one RAT, such as just LTE for instance.

OVERVIEW

In a representative dual-connectivity arrangement, one base station operating under a first RAT could serve as a master node (MN) with which the UE initially connects, and another base station operating under a second RAT could serve as a secondary node (SN) to provide the UE with additional frequency bandwidth so as to support higher throughput or the like. For example, with an example implementation of EN-DC, a 4G base station (e.g., an evolved Node-B (eNB)) could operate as the MN, and a 5G NR base station (e.g., a gigabit Node-B (gNB)) could operate as the SN.

When the UE enters into coverage of the MN (i.e., a base station that will ultimately serve as an MN for dual-connectivity service), the UE could discover the MN coverage and could responsively engage in signaling with the MN to establish a connection between the UE and the MN, referred to as a master connection. Further, the UE could engage in attach signaling with a core network controller via the master connection, to attach or register for service with the network, and the core network controller could responsively coordinate establishment for the UE of one or more bearers between the MN and a core-network gateway, for carrying user-plane packet data communications to and from the UE.

The MN could then serve the UE in a standalone-mode with wireless packet-data communications. For instance, when the MN receives packet-data from the gateway for transmission to the UE, the MN could allocate downlink air interface resources (e.g., time-frequency resources) on which to transmit the data to the UE, the MN could transmit to the UE a scheduling directive that indicates the transmission will occur on the allocated resources, and the MN could transmit the data to the UE as indicated. And when the UE has data to transmit, the UE could send to the MN a scheduling request, the MN could responsively allocate uplink resources on which the UE will transmit the data to the MN and could transmit to the UE an associated scheduling directive, and the UE could transmit the data to the MN accordingly for forwarding to the gateway. Further, other signaling communication such as acknowledgement signaling and the like could pass over the air between the UE and the MN to help manage these transmissions over the master connection.

In addition, the MN could trigger and/or engage in a process to establish for the UE a secondary connection with an SN, so that the MN and SN can cooperatively provide the UE with dual-connectivity service. For instance, the MN could direct the UE to scan for secondary coverage under the second RAT and could responsively receive from the UE a report that the UE detected threshold strong coverage of an SN. The MN could then responsively engage in signaling with that SN and with the UE to coordinate establishment of a secondary connection between the UE and the SN, and the MN could further engage in signaling to prepare the SN to serve the UE.

Through this or other signaling, the MN could also arrange for splitting of one or more bearers established for the UE, so that the MN and SN could then concurrently serve the UE with data communications.

For instance, the MN could engage in signaling with the core network controller to cause the core network controller to coordinate splitting of a UE bearer at the core-network gateway, with one leg of the bearer extending between the gateway and the MN and another leg of the bearer extending between the gateway and the SN. When the gateway has data to transmit to the UE, the gateway could then send a portion of the data to the MN and the MN could schedule and provide transmission of the data over the master connection to the UE as discussed above, and the gateway could send another portion of the data to the SN and the SN could similarly schedule and provide transmission of the data over the secondary connection to the UE. And likewise, when the UE has data to transmit, the UE may work with the MN to coordinate and provide uplink transmission for forwarding to the gateway.

Alternatively, the MN could set up a bearer split itself, though which the MN would exchange a portion of the UE's data with the SN over an inter-base-station interface. With this arrangement, when the gateway has data to transmit to the UE, the gateway would thus send all of that data to the MN, and the MN would schedule and provide transmission of a portion of that data to the UE over the master connection and would send another portion of the data to the SN for scheduling and transmission by the SN over the secondary connection to the UE. And when the UE has data to transmit, the UE may work with the MN to coordinate and provide uplink transmission for forwarding to the gateway.

Other dual-connectivity bearer arrangements could be possible as well. For instance, in another implementation, the MN and SN may each use separate core networks. And in that case, the MN may interact with the SN to trigger the SN establishing of a bearer for the UE through the SN's core network, in parallel with the MN's bearer through its own core network for the UE.

In certain dual-connectivity implementations, the existence of the UE's master connection with the MN is important for maintaining good, efficient operation of the UE's secondary connection with the SN.

For example, the UE's master connection could be the anchor for all RRC messages related to handover of the UE's secondary connection. For instance, when the UE's secondary connection becomes threshold weak and perhaps when the UE detects threshold stronger coverage as a target for handover of the UE's secondary connection, the UE may be set to transmit an associated measurement report over the UE's master connection to the MN. And the MN may then coordinate handover of the UE's secondary connection.

If the UE loses its master connection with the MN, issues could therefore arise with respect to the UE's service over its secondary connection with the SN. For example, if the UE's secondary connection becomes threshold weak, the UE may be unable to report that to the MN, and the UE's secondary connection may drop, which could result in interruption of data communications and a resulting poor user experience.

One situation where the UE may lose its master connection with the MN, and therefore where this or other such problems may arise, is when the UE is engaged in a voice call served by the MN under a particular RAT and the UE stops being served by the MN in order to continue engaging in the voice call served instead by another node under a different RAT. An example of this situation can occur where a UE is configured with a chipset that includes an LTE radio and a CDMA radio and that enables the UE to engage in either LTE or CDMA communication but not both concurrently, and where the UE is engaged in a voice call served by an MN over LTE but the UE starts losing LTE coverage. In that situation, a single-radio-voice-call-continuity (SRVCC) process may apply to transfer the UE's voice call from being served by the MN over LTE to instead being served by a CDMA node (base station) over CDMA. As a result, the UE would lose its master connection with the MN in order to continue engaging in the voice call instead over CDMA.

To help avoid an issue with the UE's secondary connection when the UE loses its master connection due to such a voice call transfer, the present disclosure provides for intentionally transitioning the UE from dual-connectivity service to standalone service before carrying out of the voice call transfer.

In particular the disclosure addresses a scenario where a UE is served with dual-connectivity by an MN over master connection on a first RAT and an SN over a secondary connection on a second RAT and where the UE is engaged in a voice call over the master connection. In that scenario, the disclosure provides for detecting that quality of the UE's master connection has become threshold poor and for responsively (i) releasing the UE's secondary connection with the SN so as to transition the UE from dual-connectivity to standalone-connectivity served by the MN, and (ii) then transferring the UE's voice call from being served by the MN on the first RAT to instead being served by a tertiary node (TN) on a third RAT.

By way of example, at issue could be a scenario where a UE is served with EN-DC by an MN over an LTE connection and an SN over a 5G NR connection and where the UE is engaged in a voice call served by the MN over the LTE connection. In that scenario, the disclosure could provide for detecting that the UE is losing LTE coverage and responsively (i) first releasing the UE's 5G NR connection with the SN, to transition the UE from EN-DC service to standalone 4G service by the MN, and (ii) then applying SRVCC to transfer the UE's voice call from being served by the MN over LTE to instead being served by a legacy CDMA base station over CDMA.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

An example implementation will now be described in the context of a system including an EN-DC network and a legacy CDMA network. However, it should be understood that the principles disclosed herein could extend to apply with respect to other scenarios as well, such as with respect to other RATs and other dual-connectivity configurations. Further, it should be understood that other variations from the specific arrangements and processes described are possible. For instance, various described entities, connections, functions, and other elements could be added, omitted, distributed, re-located, re-ordered, combined, or changed in other ways. In addition, it should be understood that operations described as being performed by one or more entities could be implemented in various ways, such as by a processor executing instructions stored in non-transitory data storage, along with associated circuitry or other hardware, among other possibilities.

Figure 1:
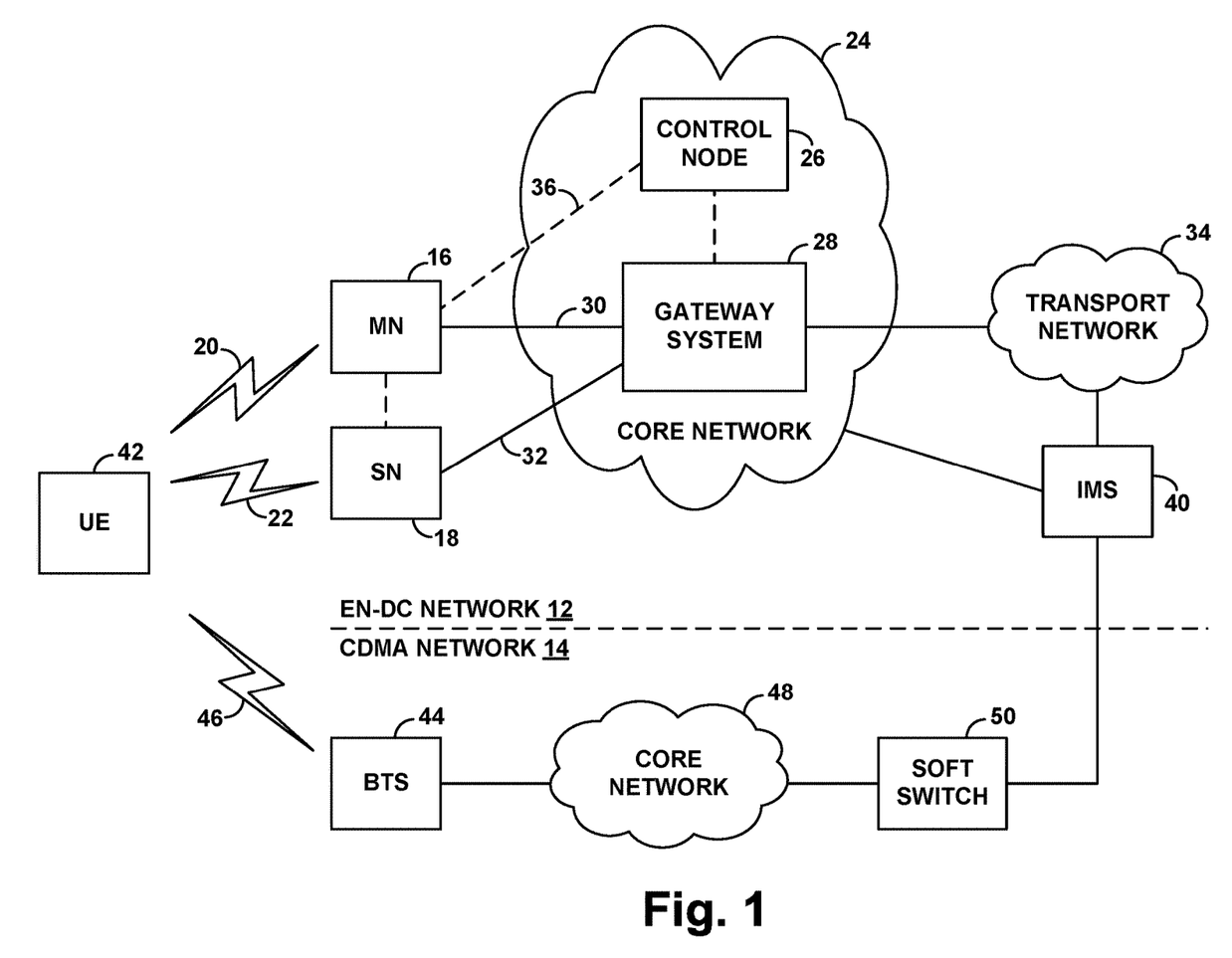
FIG. 1 is a simplified block diagram of an example network arrangement in which aspects of the present disclosure can be implemented.

FIG. 1 is a simplified block diagram of an example network arrangement, showing at its top portion an EN-DC network 12 for providing wireless-packet-data service according to 4G LTE and 5G NR protocols, and showing at its bottom portion a legacy CDMA network 14 for providing wireless circuit-data services such as legacy circuit-switched voice call service for instance.

EN-DC network 12 includes a representative MN 16, likely an LTE eNB, and a representative SN 18, likely a 5G NR gNB. The MN 16 and SN 18 could be co-located at a common cell site, sharing an antenna tower or other antenna structure, and sharing baseband hardware or the like, but being separately defined to provide discrete 4G and 5G connections and service. Further, the MN and SN could each be configured to provide respective coverage 20, 22 on one or more carriers as discussed above, defining respective frequency bandwidth and air-interface resources for carrying communications wirelessly to/from served UEs.

In an example implementation, the respective coverage on each carrier of coverage 20 and coverage 22 could be divided over time into frames, subframes, timeslots, and symbol segments, and could be divided over frequency bandwidth into subcarriers. As a result, the respective coverage could define an array of time-frequency resource elements, in which subcarriers can be modulated to carry data communications.

In each subframe, these resource elements could be divided into groups defining physical resource blocks (PRBs) that are allocable by the associated base station (MN or SN) on an as-needed basis to carry data communications. And certain resource elements per subframe could be reserved for other purposes. In LTE for instance, a first time portion of each downlink subframe is reserved as a control region to carry downlink control-plane signaling such as scheduling directives and acknowledgement messaging, and the low-end and high-end portions of the carrier bandwidth in each uplink subframe are reserved as a control region to carry uplink control-plane signaling such as scheduling requests; and certain designated resource elements are reserved to carry other signals, such as synchronization signals, broadcast-channel signals, reference signals, random-access signals, and the like.

Note also that the 4G air interface and 4G service provided respectively by MN 16 could differ from the 5G air interface and 5G service provided by 5G SN 18 in various ways now known or later developed. For example, one may provide variable subcarrier spacing, but the other may provide fixed subcarrier spacing. As another example, one may have different symbol time segments than the other. As still another example, one may make use of different MIMO technologies than the other. And as yet another example, with TDD carriers, one may have a flexible TDD configuration and the other may have a fixed TDD configuration. Other examples are possible as well.

As further shown in the example of FIG. 1, the MN and SN are each connected with a core network 24, which includes a gateway system 28 and a control node 26. In an example core network, the gateway system 28 could include a serving gateway (SGW) and a packet-data network gateway (PGW) (neither shown), with the SGW having a communication interface 30 with the MN and a communication interface 32 with the SN, and with the PGW providing connectivity with a transport network 34 such as the Internet or a private network. And the control node 26 could be a mobility management entity (MME), which could have a communication interface 36 with the MN and a communication interface 38 with the gateway system 28 (e.g., with the SGW).

Also shown accessible on or via core network 24 or transport network 34 is an Internet Multimedia Subsystem (IMS) 40. The IMS could support voice over packet (VOP) service, and other types of packet-based real-time media services, for served UEs. For instance, the IMS could support Session Initiation Protocol (SIP) signaling with served UEs to set up and manage VOP calls, and the IMS could include a media server to bridge and connect such calls to remote call parties or the like. Thus, a served UE might engage in SIP signaling with the IMS to set up an incoming or outgoing VOP call, establishing a packet-based real-time media session (e.g., Real-time Transport Protocol (RTP) session) between the UE and IMS, which the IMS might bridge with a remote party, to facilitate voice call communication between the UE and the remote party.

When a UE 42 initially enters into coverage of this EN-DC network 12, the UE could discover coverage of the MN, such as by scanning predefined 4G carriers to find a synchronization signal from the MN and then determining that a reference signal from the MN is strong enough to justify connecting. The UE could then engage in random-access signaling and Radio Resource Control (RRC) signaling with the MN to establish an RRC connection with the MN, defining a master connection between the UE and the MN.

The UE could then engage in attach signaling with the control node 26, via that master connection and MN, to register for service with the network 12. And after authenticating the UE, the control node 26 could coordinate setup for the UE of one or more user-plane bearers each including an interface between the MN and the gateway system, and the MN could engage in signaling with the UE to establish for each such bearer a data radio bearer that extends between the UE and the MN. Further, the control node 26 and/or the UE could provide the MN with a set of capabilities data describing capabilities of the UE, and the MN could store that data in a context record associated with the UE's master connection.

In this process, the control node 26 could set up a best-efforts bearer for the UE at this stage and the MN could extend that best-efforts bearer over the air to the UE, to enable the UE to engage in general Internet data communication via the gateway system. Further, if the UE supports VOP service and if the MN supports VOP service, the control node 26 could also set up for the UE an IMS signaling bearer and the MN could extend that IMS signaling bearer over the air to the UE, for use by the UE to engage in SIP signaling with the IMS 40 as discussed above.

As noted above, the MN could additionally work to set up EN-DC service for the UE. For instance, the MN could send to the UE an RRC message that directs the UE to scan for and report any threshold strong coverage that the UE detects on 5G carriers. And upon receipt of such a report from the UE specifying that the UE detected threshold strong coverage of coverage of SN 18, the MN could then engage in signaling with that SN and with the UE to coordinate setup of the secondary connection between the SN and the UE. Further, the MN could engage in signaling to coordinate splitting of one or more bearers for the UE, so as to enable the MN and SN to concurrently serve the UE over their respective RRC connections with the UE. For instance, as noted above, the MN could engage in signaling with the control node to trigger and/or coordinate a bearer split at the gateway system, or the MN could engage in signaling with the SN to trigger and/or coordinate a bearer split at the MN.

As discussed above, the MN and SN could then cooperatively provide the UE with EN-DC service. For example, with a bearer split at the gateway, as the gateway system receives downlink data destined to the UE, the gateway system could send some of that data respectively over each leg of the UE's split bearer, and the MN and SN could each schedule transmission to the UE of their respective portion of that data. Or with a bearer split at the MN, as the gateway system receives downlink data destined to the UE, the gateway system could send that data to the MN, the MN could schedule transmission of a portion of the data to the UE and could pass another portion of the data to the SN, and the SN could schedule transmission of that portion of the data to the UE.

In this process, for communication of the data from the MN to the UE, the MN could generate and transmit over its master connection to the UE one or more scheduling directives that designate which PRBs will carry data to the UE over the master connection from the MN, and the MN could transmit the data to the UE in the designated PRBs of the master connection. Likewise, for communication of the data from the SN to the UE, the SN could generate and provide scheduling directives that designate which PRBs will carry data to the UE over the secondary connection from the SN, and the SN could transmit the data to the UE in the designated PRBs of the secondary connection.

In an example system, the MN might be configured to support the VOP service, but the SN might not. Therefore, while the UE may make use of its EN-DC connections with the MN and SN to engage in high-data-rate packet-data communications generally, the UE may use just its master connection with the MN, and not its secondary connection with the SN, to engage in VOP service. Accordingly, when the EN-DC service is being configured for the UE, the UE's best-efforts bearer served by the LTE MN might be split to allow the MN and SN to cooperatively provide the UE with EN-DC service, whereas the UE's VOP bearer served by the MN could remain served by just the MN rather than being split with the SN.

In such an arrangement, to facilitate voice service once the UE has connected with the MN, the UE could engage in SIP signaling with the IMS via the UE's master connection and the UE's IMS signaling bearer to register with the IMS, so that the IMS will know where to reach the UE for calls placed to the UE. Further, to facilitate a possible later SRVCC transition of the UE's voice call, the UE could include in its IMS registration signaling an indication that the UE is SRVCC-capable or another SRVCC-related indication. And in a SIP response (e.g., in a Feature Capabilities (FCAP) header of a SIP response), the IMS could provide the UE with an IMS transfer-address (session-transfer number (STN-SR)) that points to an IMS access transfer control function (ATCF) that controls an IMS access transfer gateway (ATGW) through which IMS-based communications can be set up.

When the UE has a voice call to place or the IMS has a voice call to connect to the UE, the UE could then engage in SIP signaling with the IMS via the UE's master connection and the UE's IMS signaling bearer, to set up a packet-based voice session with the IMS. Further, the IMS could responsively engage in signaling with the core network to cause the core network to set up for the UE a dedicated VOP bearer, which the MN could extend to the UE over a radio data bearer on the UE's master connection. The UE could then engage in the resulting voice call over this established VOP bearer and the UE's packet-based voice session with the IMS.

Turning next to the lower portion of FIG. 1, the example CDMA network is shown including a representative CDMA base station (base transceiver station (BTS)) 44. This BTS could be co-located with the MN and SN at a common cell site, sharing an antenna tower or other antenna structure, and sharing other equipment. But the BTS provides its own respective CDMA coverage 46. This CDMA coverage could be provided on a carrier, such as a 1.25 MHz carrier, with various dedicated channels defined on the carrier through spread-spectrum modulation using respective Walsh codes and a pseudo-random noise offset. For instance, the carrier might define a plurality of discrete traffic channels, access channels, paging channels, and the like.

As further shown, the BTS is coupled with a core network 48. Core network 48 may include various nodes (not shown) such as a base station controller (BSC), a mobile switching center (MSC), a home location register (HLR), an inter-working function (IWF), and a packet-data serving node (PDSN), among other possibilities. Further, the core network could include or be interconnected with a soft-switch 50, possibly instead of the MSC, which could interface between (i) circuit-switched voice communications and associated signaling in the CDMA network and (ii) VOP communications and signaling at the IMS.

When a UE enters into coverage of the CDMA network, the UE could register for service with the CDMA network by transmitting a registration message over an access channel to the BTS, which the BTS could forward to the MSC. The MSC could engage in registration-notification signaling with the HLR to record the fact that the UE is being served by the BTS.

When the UE seeks to place a voice call via CDMA, the UE could then transmit an origination request message over an access channel to the BTS, which the BTS could forward to the MSC, and the MSC and/or soft-switch could engage in signaling to set up the call via the IMS or another channel. Further, the BTS could assign a dedicated traffic channel to the UE, to enable the UE to proceed with the call. And when the core network 46 receives signaling indicating an incoming voice call for the UE, the network could route the call to the BTS, and the BTS could page the UE during an instance of a periodic paging interval in which the UE is scheduled to scan the CDMA air interface for page messages. Upon receipt of that page message, the UE could then transmit an page response on an access channel to the BTS, the BTS could assign a dedicated traffic channel to the UE, and the call can proceed.

In a representative implementation, the UE could be programmed to prefer operation with 4G LTE over operation with CDMA, in order to benefit from high-throughput packet-data service. Therefore, when the UE is initially scanning for coverage and service, if the UE finds both coverage of the 4G MN 16 and coverage of the CDMA BTS 44, the UE may decide to establish a 4G connection with the MN as discussed above rather than registering for CDMA service. In turn, the MN may then configure EN-DC service for the UE as discussed above, so that the UE would be served concurrently over a master 4G connection by the MN 16 and a secondary 5G connection by the SN 18.

With this arrangement, if and when the UE is engaged in a voice call served by the MN, the UE may encounter a situation where the quality of the UE's master connection with the MN becomes threshold poor and where it would be beneficial for the UE's voice call to be transferred from being served over LTE by the MN 16 to being served instead over CDMA by BTS 44. This could happen if the UE moves threshold far away from the MN or the UE's master connection with the MN degrades for another reason, and where the UE is at the edge of LTE coverage, e.g., where there is not another neighboring LTE base station to which the UE can hand over in order to continue its voice call on LTE.

Here, the poor quality of the UE's master connection with the MN could be measured in terms of signal-to-interference-plus-noise ratio (SINR), reference signal receive power (RSRP), reference signal receive quality (RSRQ) block error rate (BER), packet loss, and/or one or more other metrics, with the poor connection quality correlating with poor quality of the UE's voice call on the connection.

In an example scenario, the MN could detect that the quality of the UE's master connection has become threshold poor based on the MN's analysis of uplink communications from the UE or based on downlink channel-quality reporting that the MN receives from the UE. In that scenario, if the UE does not also report to the MN that the UE has detected threshold strong enough coverage from a neighboring LTE base station as a target for handover, the MN could conclude that the UE is at the edge of LTE coverage.

Therefore, the MN could invoke SRVCC of the UE's voice call, to transition the UE's voice call from being served by the MN over LTE to being served instead by BTS 44 over CDMA. For instance, the MN could transmit to the UE over the UE's master connection an RRC connection-release message or other message that carries a directive for the UE to engage in an SRVCC transition. And in response to this directive, the UE could then engage in SRVCC transition of its voice call, switching from LTE service by the MN to CDMA service by the BTS.

This SRVCC process could involve the UE registering with the CDMA network if it has not already, and transmitting to the BTS a call origination message that carries the STN-SR that the UE received during its IMS registration. In response to this origination message, a switch or other node of the CDMA network could then responsively transmit a SIP INVITE message directed to that STN-SR, and thus to the ATCF, so as to trigger setup of a bridge between the ATGW and the CDMA network and therefore to bridge the UE's existing voice call to the UE via CDMA.

As noted above, this SRVCC transition would result in loss of the UE's master connection with MN 16, which could result in inefficiency or other issues related to operation of the UE's secondary connection with SN 18.

To overcome this technical issue, as noted above, the present disclosure provides for the MN taking action to release the UE's secondary connection in response to a determination that SRVCC will occur but before invoking the SRVCC process. For example, the MN could engage in signaling with the SN and/or with the UE to coordinate release of the UE's secondary connection, and the MN could engage in signaling with the SN and/or the core network to discontinue splitting of the UE's bearer. Thus, the UE would be transitioned from being served with EN-DC by the MN and SN to instead being served in a standalone-mode by MN.

In response to so transitioning the UE from dual-connectivity to standalone connectivity, the MN could then invoke the SRVCC process. For instance, conditional upon the MN so transitioning the UE from dual-connectivity service provided by the MN and SN to standalone service provided by the MN, or in response to starting that transition, the MN could the signal to the UE to direct the UE to engage in SRVCC as noted above.

Beneficially through this sequence of events, the MN could help prevent inefficiencies related to failed operation on the UE's secondary connection with the SN resulting from the UE losing its master connection with the MN when the UE's voice call gets transferred to a different RAT such as CDMA.

Figure 2:
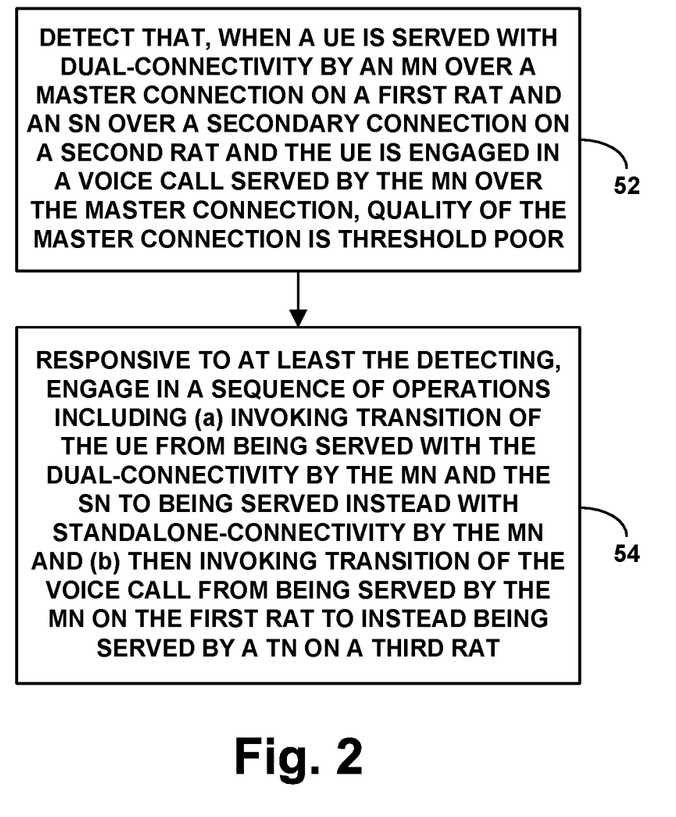
FIG. 2 is a flow chart depicting an example method in accordance with the disclosure.

FIG. 2 is a flow chart depicting a method that can be carried out in accordance with this disclosure, to control connectivity of a UE. This method could be carried out by an MN and/or by one or more other entities.

As shown in FIG. 2, at block 52, the method involves detecting that, when the UE is served with dual-connectivity by an MN over a master connection on a first RAT and an SN over a secondary connection on a second RAT and the UE is engaged in a voice call served by the MN over the master connection, quality of the master connection is threshold poor. And at block 54, the method involves, responsive to at least the detecting, engaging in a sequence of operations including (a) invoking transition of the UE from being served with the dual-connectivity by the MN and the SN to being served instead with standalone-connectivity by the MN and (b) then invoking transition of the voice call from being served by the MN on the first RAT to instead being served by a TN on a third RAT.

In line with the discussion above, in this method, the act of engaging in operation a (i.e., invoking the transition from dual-connectivity to standalone connectivity) could be a pre-condition for engaging in operation b (i.e., invoking the voice call transfer). Further, engaging in the sequence of operations could involve carrying out operation b once the UE is transitioned from being served with the dual-connectivity by the MN and the SN to being served instead with the standalone-connectivity by the MN or could involve carrying out operation b once that operation of transitioning the UE from dual-connectivity to standalone-connectivity is started, such as once the MN engages in first signaling as part of that operation.

Also in line with the discussion above, the act of detecting that quality of the master connection is threshold poor could be based on at least one metric such as signal-to-interference-plus-noise ratio, reference signal receive power, reference signal receive quality, block error rate, and/or packet loss. And the detecting could be based on reporting from the UE. And engaging in the sequence of operations could be further responsive to an absence of handover-target coverage on the first RAT, such as where the UE has not reported detecting strong enough target coverage on the first RAT to support handover from the MN and continuation of the voice call on the first RAT.

As further discussed above, the act of invoking transition of the UE from being served with the dual-connectivity by the MN and the SN to being served instead with standalone-connectivity by the MN could involve the MN signaling with the SN and with the UE, to coordinate release of the secondary connection. And invoking transition of the voice call from being served by the MN on the first RAT to instead being served by the TN on the third RAT could involve invoking SRVCC transition of the voice call.

Yet further, as discussed above, the first RAT could be 4G LTE, the second RAT could be 5G NR, and the third RAT could be CDMA, among other possibilities. And the UE could engage in the voice call as a VOP call when served by the MN and as a voice-over-circuit (VOC) call when served by the TN.

Figure 3:
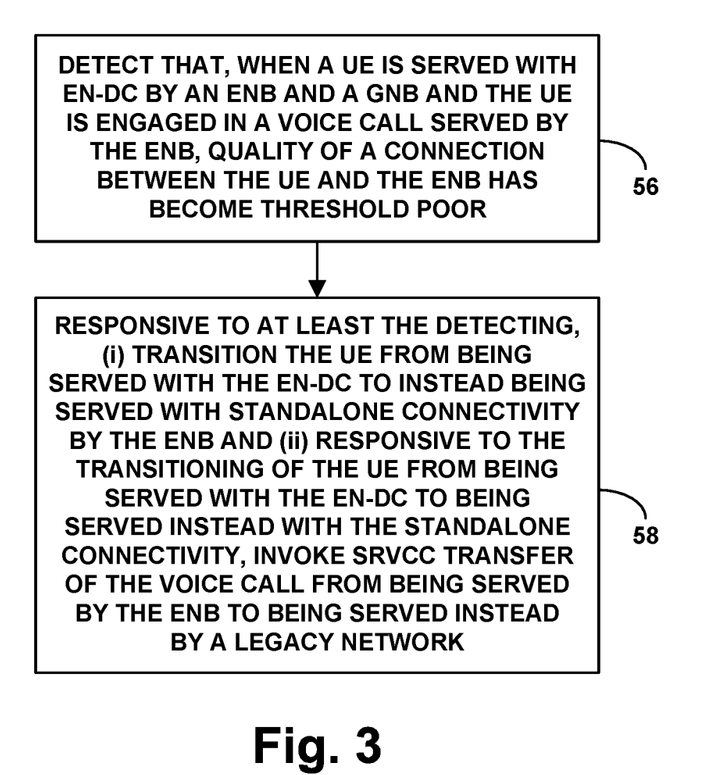
FIG. 3 is another flow chart depicting an example method in accordance with the disclosure.

FIG. 3 is another flow chart depicting a method that can be carried out in accordance with this disclosure, to control connectivity of a UE. This method as well could be carried out by an MN and/or by one or more other entities.

As shown in FIG. 3, at block 56, the method includes detecting that, when the UE is served with EN-DC by an eNB and a gNB and the UE is engaged in a voice call served by the eNB, quality of a connection between the UE and the eNB has become threshold poor. And at block 58, the method includes, responsive to at least the detecting, (i) transitioning the UE from being served with the EN-DC to instead being served with standalone connectivity by the eNB and (ii) responsive to the transitioning of the UE from being served with the EN-DC to being served instead with the standalone connectivity, invoking SRVCC transfer of the voice call from being served by the eNB to being served instead by a legacy network such as a CDMA network or Global System for Mobile Communications (GSM) network, among other possibilities.

Various features discussed above can be implemented in this context as well, and vice versa.

Figure 4:
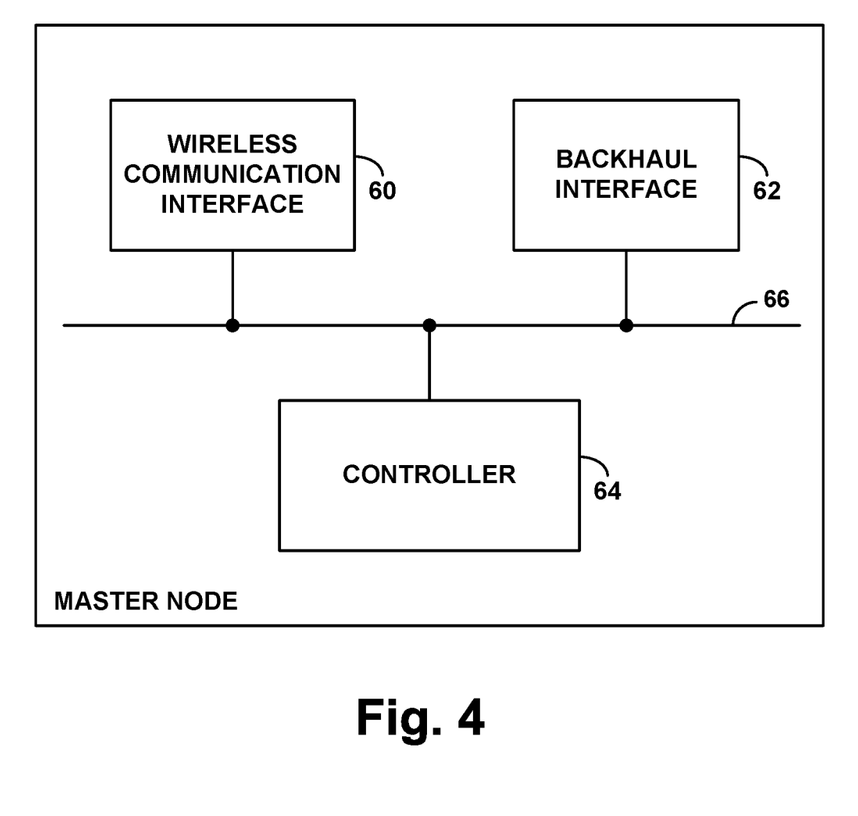
FIG. 4 is a simplified block diagram of an example MN operable in accordance with the disclosure.

FIG. 4 is a simplified block diagram of an example MN operable in accordance with present disclosure. As shown, the example MN includes a wireless communication interface 60, a backhaul interface 62, and a controller 64, all of which may be communicatively linked together by a system bus, network, or other connection mechanism 66 and/or could be integrated together or distributed in various ways.

In this example arrangement, the wireless communication interface 60 could be configured to provide cellular coverage and to engage in air interface communication with served UEs. As such, wireless communication interface 60 could comprise an antenna structure, which could be tower mounted or could take other forms, and associated components such as a power amplifier and a wireless transceiver, so as to facilitate providing a coverage area defining an air interface having a downlink and an uplink, and engaging in transmission and reception of bearer and control data over the air interface in accordance with a RAT such as any of those noted above. Further, backhaul interface 62 could comprise a wired or wireless interface, such as an Ethernet network communication interface, configured to support communication with other entities, such as with various core network entities and other base stations for instance.

Controller 64 could then comprise control logic to cause the MN to carry out particular operations including those described herein. As such, the controller 64 could take various forms, including but not limited to a processing unit including one or more processors (e.g., one or more general purpose microprocessors and/or one or more dedicated processing units) and non-transitory data storage (e.g., one or more volatile and/or non-volatile storage components, such as magnetic, optical, or flash storage) holding program instructions executable by the processing unit to cause the MN to carry out various operations described herein and thus to control operation of the MN.

It should also be understood that the present disclosure also contemplates a non-transitory computer readable medium having encoded thereon program instructions executable to carry out such operations as well.

In an example implementation, for instance, the controller could be configured to detect that, when the UE is served with dual-connectivity by the MN over a master connection on a first RAT and a SN over a secondary connection on a second RAT and the UE is engaged in a voice call served by the MN over the master connection, quality of the master connection is threshold poor. And the controller could be configured to respond to at least the detecting by engaging in a sequence of operations including (a) invoking transition of the UE from being served with the dual-connectivity by the MN and the SN to being served instead with standalone-connectivity by the MN and (b) then invoking transition of the voice call from being served by the MN on the first RAT to instead being served by a TN on a third RAT.

Here too, various features discussed above can be implemented in this context as well, and vice versa.

Exemplary embodiments have been described above. Those skilled in the art will understand, however, that changes and modifications may be made to these embodiments without departing from the true scope and spirit of the invention.

We claim:

1. A method for controlling connectivity of a user equipment device (UE), the method comprising:

when the UE is served with dual-connectivity by a master node (MN) over a master connection on a first radio access technology (RAT) and a secondary node (SN) over a secondary connection on a second RAT and the UE is engaged in a voice call served by the MN over the master connection, detecting, based on quality of the master connection, that the voice call should be transitioned from being served by the MN on the first RAT to instead being served by a tertiary node (TN) on a third RAT;

as a pre-condition for invoking the transition of the voice call from being served by the MN on the first RAT to instead being served by the TN on the third RAT, invoking transition of the UE from being served with the dual-connectivity by the MN and the SN to being served instead with standalone-connectivity by the MN; and after the transition of the UE from being served with the dual-connectivity by the MN and SN to being served instead with the standalone-connectivity by the MN, invoking transition of the voice call from being served by the MN on the first RAT to instead being served by the TN on a third RAT.

2. The method of claim 1, carried out by the MN.

3. The method of claim 1, wherein detecting that the voice call should be transitioned from being served by the MN on the first RAT to instead being served by the TN on a third RAT is based on at least one metric selected from the group consisting of signal-to-interference-plus-noise ratio, reference signal receive power, reference signal receive quality, block error rate, and packet loss.

4. The method of claim 1, wherein detecting that the voice call should be transitioned from being served by the MN on the first RAT to instead being served by the TN on a third RAT is based on reporting from the UE.

5. The method of claim 1, wherein invoking the transition of the UE from being served with the dual-connectivity by the MN and SN to being served instead with the standalone-connectivity by the MN and invoking the transition of the voice call from being served by the MN on the first RAT to instead being served by the TN on a third RAT are further responsive to an absence of handover-target coverage on the first RAT.

6. The method of claim 1, wherein invoking transition of the UE from being served with the dual-connectivity by the MN and the SN to being served instead with standalone-connectivity by the MN comprises the MN signaling with the SN and with the UE to coordinate release of the secondary connection.

7. The method of claim 1, wherein invoking transition of the voice call from being served by the MN on the first RAT to instead being served by the TN on the third RAT comprises invoking single-radio-voice-call-continuity (SRVCC) transition of the voice call.

8. The method of claim 1, wherein the first RAT is 4G LTE, wherein the second RAT is 5G NR, and wherein the third RAT is CDMA.

9. The method of claim 1, wherein when the UE engages in the voice call as a voice-over-packet call when served by the MN and as a voice-over-circuit call when served by the TN.

10. A method for controlling connectivity of a user equipment device (UE), the method comprising:
when the UE is served with EUTRA-NR Dual Connectivity (EN-DC) by an evolved-Node-B (eNB) and a gigabit-Node-B (gNB) and the UE is engaged in a voice call served by the eNB, detecting, based on quality of a connection between the UE and the eNB, that the voice call should be transferred from being served by the eNB to being served instead by a legacy network;
as a pre-condition for invoking transfer of the voice call from being served by the eNB to being served instead by the legacy network, transitioning the UE from being served with the EN-DC to instead being served with standalone connectivity by the eNB; and
responsive to the transitioning of the UE from being served with the EN-DC to being served instead with the standalone connectivity, invoking single-radio-voice-call-continuity (SRVCC) transfer of the voice call from being served by the eNB to being served instead by a legacy network.

11. A master node (MN) configured to control connectivity of a user equipment device (UE), the MN comprising:
a wireless communication interface configured to engage in wireless communication with the UE;
a backhaul network interface through to communicate with other entities; and
a controller configured to control operation of the MN,
wherein, when the UE is served with dual-connectivity by the MN over a master connection on a first radio access technology (RAT) and a secondary node (SN) over a secondary connection on a second RAT and the UE is engaged in a voice call served by the MN over the master connection, the controller is configured to detect, based on quality of the master connection, that the voice call should be transitioned from being served by the MN on the first RAT to instead being served by a tertiary node (TN) on a third RAT,
wherein the controller is configured (a) as a pre-condition for invoking the transition of the voice call from being served by the MN on the first RAT to instead being served by the TN on the third RAT, to invoke transition of the UE from being served with the dual-connectivity by the MN and the SN to being served instead with standalone-connectivity by the MN, and (b) after the UE has been transitioned from being served with the dual-connectivity by the MN and the SN to being served instead with the standalone-connectivity by the MN, to invoke transition of the voice call from being served by the MN on the first RAT to instead being served by the TN on a third RAT.

12. The MN of claim 11, wherein detecting that detecting that the voice call should be transitioned from being served by the MN on the first RAT to instead being served by the TN on a third RAT is based on at least one metric selected from the group consisting of signal-to-interference-plus-noise ratio, reference signal receive power, reference signal receive quality, block error rate, and packet loss.

13. The MN of claim 11, wherein detecting that the voice call should be transitioned from being served by the MN on the first RAT to instead being served by the TN on a third RAT is based on reporting from the UE.

14. The MN of claim 11, wherein the invoking the transition of the UE from being served with the dual-connectivity by the MN and SN to being served instead with the standalone-connectivity by the MN and invoking the transition of the voice call from being served by the MN on the first RAT to instead being served by the TN on a third RAT are further responsive to an absence of handover-target coverage on the first RAT.

15. The MN of claim 11, wherein invoking transition of the UE from being served with the dual-connectivity by the MN and the SN to being served instead with standalone-connectivity by the MN comprises the MN signaling with the SN and with the UE to coordinate release of the secondary connection.

16. The MN of claim 11, wherein invoking transition of the voice call from being served by the MN on the first RAT to instead being served by the TN on the third RAT comprises invoking single-radio-voice-call-continuity (SRVCC) transition of the voice call.

* * * * *